United States Patent [19]

Holmes et al.

[11] Patent Number: 4,479,757
[45] Date of Patent: Oct. 30, 1984

[54] BLADE CONFIGURATIONS FOR FRANCIS-TYPE TURBINE RUNNERS

[75] Inventors: David G. Holmes, Schenectady, N.Y.; Richard A. Novak, Boston, Mass.; Jacques Y. McNabb, Beaconsfield, Canada

[73] Assignee: Dominion Engineering Works Limited, Lachine, Canada

[21] Appl. No.: 431,255

[22] Filed: Sep. 30, 1982

[51] Int. Cl.³ .............................................. F01D 5/04
[52] U.S. Cl. .............................................. 416/186 R
[58] Field of Search ........ 416/186 R, 186 A, DIG. 2; 415/213 B, 500

[56] References Cited

U.S. PATENT DOCUMENTS 1,929,098 10/1933 Moody ........................... 415/164 X
3,206,807 9/1965 Hoffman et al. ......... 416/186 R UX
3,639,080 2/1972 Yamabe ........................... 416/186 R
4,108,570 8/1978 Yamabe ........................... 416/186 R

FOREIGN PATENT DOCUMENTS 31013 3/1889 Canada .
367947 1/1923 Fed. Rep. of Germany .
684947 7/1930 France .
171900 5/1960 Netherlands ....................... 416/186

Primary Examiner—Robert E. Garrett
Assistant Examiner—Joseph M. Pitko
Attorney, Agent, or Firm—Raymond A. Eckersley

[57] ABSTRACT

An improved Francis-type turbine runner permitting a significant reduction in cavitation is provided by shaping the runners extending between the ring and crown in such a fashion that at least a portion of the area of the streamlined suction face side of each blade is (when used as a turbine) exposed when viewed in the axial direction looking away from the crown.

3 Claims, 4 Drawing Figures

U.S. Patent  Oct. 30, 1984  Sheet 2 of 2  4,479,757
FIG.3.
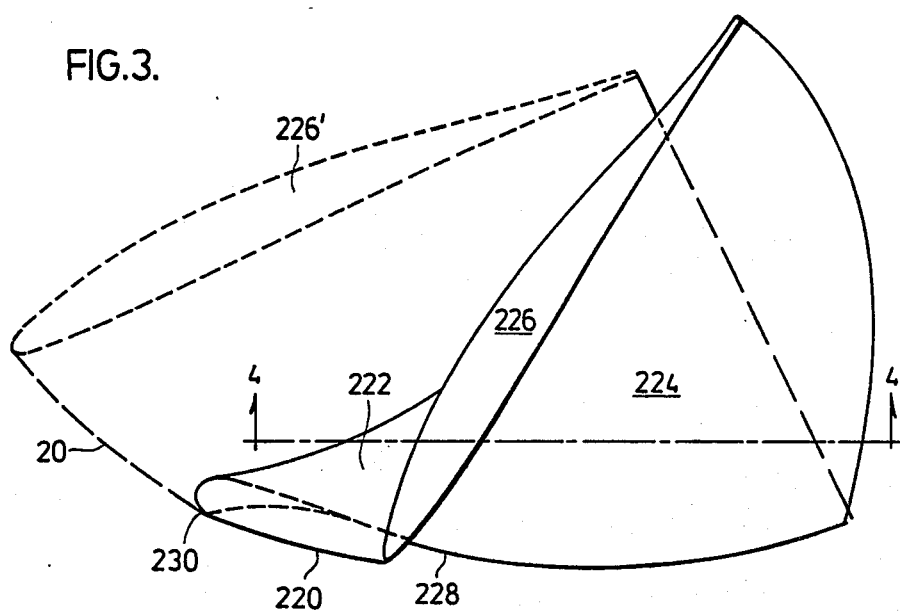
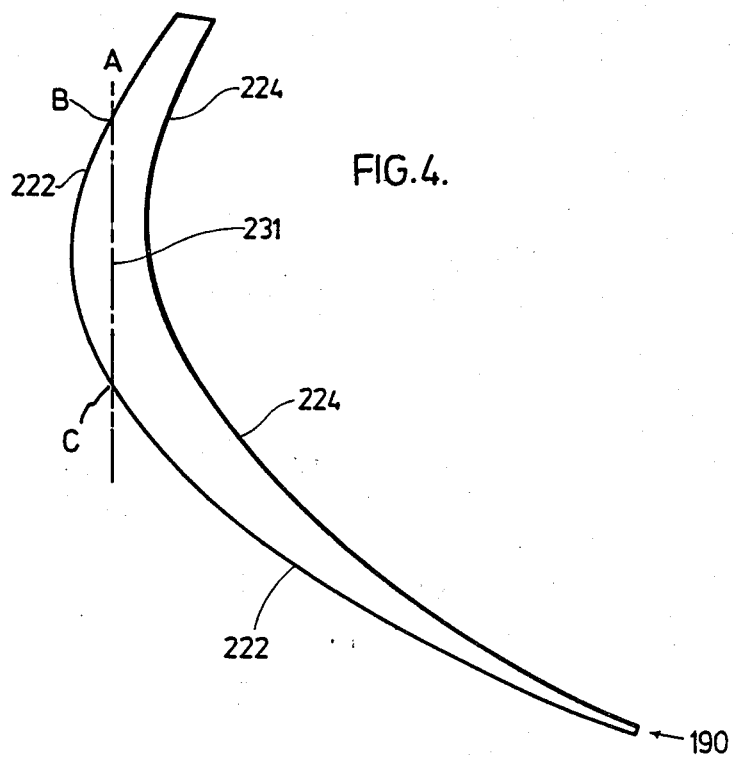
FIG.4.

BLADE CONFIGURATIONS FOR FRANCIS-TYPE TURBINE RUNNERS

FIELD OF THE INVENTION

The present invention relates to hydraulic machines and in particular to improvements in runners for Francis-type machines.

BACKGROUND OF THE INVENTION

The conventional Francis-type runner is composed of a crown section with a concentric band or ring section and an array of blades extending between and interconnecting the crown and hub with the ring. The runner is rotated about the axis of the crown by the action of water passing through a plurality of flow paths formed one between each pair of adjacent blades in the array of blades. Each of the blades has a flow dividing edge which defines the line of demarkation between a suction surface leading in the direction of rotation and a trailing pressure surface. The blades are normally oriented so that the runner slopes from the outlet toward the crown to advance in the direction of rotation of the runner.

One of the problems inherent in conventional runner designs is their susceptability to cavitation damage, particularly at or near the fillet forming the junction of the band and the suction face of the blades immediately downstream of the flow dividing edge in the direction of water flow. Such cavitation has been known to cause severe damage to the blade requiring field repair and in some cases blade modifications which are both very costly and difficult to perform.

Such cavitation also is indicative of poor velocity distribution in the flowing liquid which inherently will reduce the hydraulic efficiency of the equipment. It is obviously advantageous to minimize such hydraulic losses where possible (see for example Canadian Pat. No. 748,229—Sproule et al, dated Dec. 13, 1966.)

Generally the turbine blade is designed or contoured to minimize cavitation and maximize efficiency. In some cases it has been found necessary to surface finish the runner in discrete locations, particularly in the fillet area, forming the junction between the blade and band, for example with a stainless steel overlay. This practice is also expensive and its use generally held to a minimum.

SUMMARY OF THE PRESENT INVENTION

It is the objective of the present invention to provide an improved Francis-type hydraulic turbine runner which permits reduction in cavitation, particularly at or near the fillet forming junction of the suction side of the blade and runner.

Broadly, the present invention relates to a Francis-type hydraulic turbine runner rotatable about an axis of rotation and having a crown, forming one axial end thereof a band concentric with said crown on said axis of rotation and an array of blades extending between the band and crown, said runner terminating at its end axially remote from said crown in an outlet end, each of the blades having a suction face leading in the direction of rotation of said runner (as a turbine as opposed to a pump) and a pressure face, said suction and pressure faces meeting at their outer peripheries between said band and said crown in a flow dividing edge, said faces providing substantially smooth streamlined surfaces to define flow paths between adjacent of said blades in said array, each said blade having a portion of its suction surface exposed when viewed in an axial direction toward said outlet end so that said suction face is formed in a manner such that at least a portion of said suction face extending from said band toward said crown is sloped rearward in the direction of rotation of said runner.

In the context of the instant disclosure the term streamline used to described the suction and pressure surfaces will be understood not to include surfaces that will introduce a sudden angular departure from a preceeding portion of the surface so that when the present invention is practised there are not abrupt angular changes in the flowpath defined by the surfaces on adjacent blades, i.e., there will be no abrupt changes such as the change at the junction of the two blades secured together to form the runner blades in Canadian Pat. No. 31,031—Morin et al, dated Mar. 14, 1889. Such angular departures must necessarily introduce secondary flows, thereby defeating to a large measure the advantages of the present invention. The term streamline is not intended however to imply that the curvature of the blade is necessarily constant, but the term will have a specific meaning to a man skilled in the art of fluid dynamics and particularly in the design of continuously curved working flow paths as used in hydraulic turbines and will accordingly fall within the ambit of his skill in the line of the teachings of the present invention.

The term Francis-type turbine or machine is intended to include both conventional Francis type turbines as well as Francis type pump turbines. The turbine or machine is described and defined in the specification when operating in the turbine mode as distinct from the pump mode for the Francis type pump turbine.

BRIEF DESCRIPTION OF THE DRAWINGS

Further features, object and advantages will be evident from the following detailed description of the preferred embodiments of the present invention taken in conjuction with the accompanying drawings in which:

FIG. 3 is a axial view of the turbine looking in a direction from the crown toward the outlet end of an isolated blade showing the blade of the present invention in solid lines and illustrating portions of typical blade constructed in accordance with the prior art in heavy dash lines.

FIG. 4 is a section along the line 4—4 of FIG. 3, illustrating the typical curvature of a blade constructed in accordance wth the present invention.

FIG. 1 shows a conventional prior art Francis runner 10, having a crown 12 with a conventionally shaped substantially conical hub (not shown) and forming one axial end 15 thereof, a band or ring 14 concentric with the crown on the axis of rotation of the runner and a plurality of blades 16 interposed between the crown 12 and band or ring 14. Flow paths generally indicated at 18 permit water to enter the runner in a substantially radial direction and pass smoothly through the runner to the outlet end generally indicated at 40 at the end of the runner 10 in FIG. 1 axially remote from the crown 12. These flow paths 18 are formed between pairs of adjacent blades 16. The outer peripheral edges 20 of the blades between the band 14 and crown 12 and defined by the junction of the suction face 22 leading in the direction of rotation of the runner and pressure faces 24 (trailing in the direction of rotation when operated in the turbine mode) of the blades (as will be described in more detail herein below) define the flow dividing edges 20 directing the water into adjacent flow paths on opposite sides of each of the blades. These flow dividing edges 20 are not sharp edges but are smoothly contoured to facilitate water flow along opposite faces of the blades.

Figure 1:
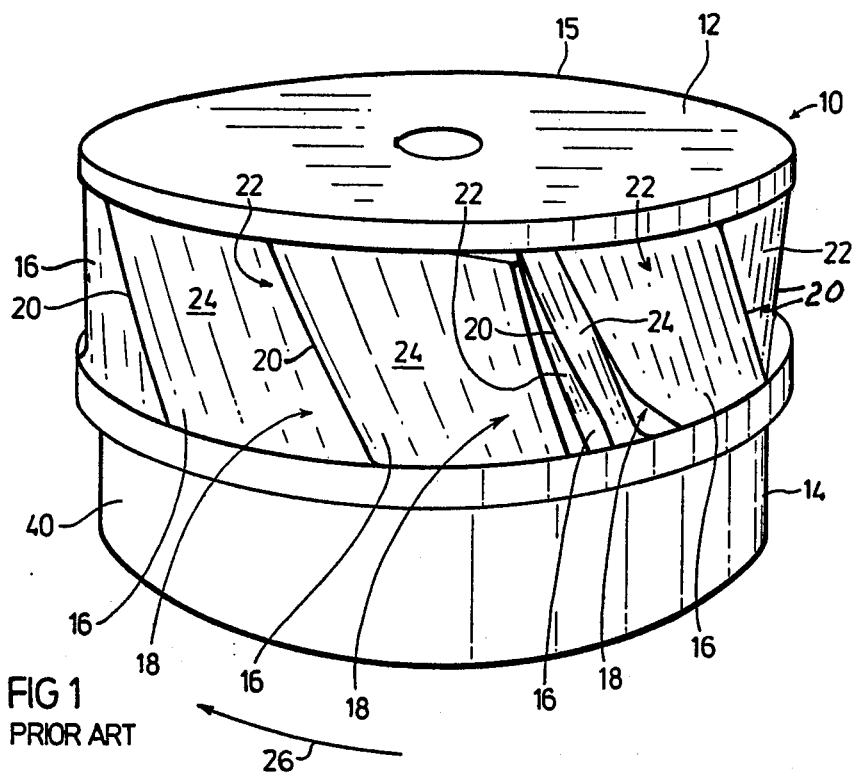
FIG. 1 is an illustration of a conventional Francis-type turbine showing a typical shape and orientation of the blades.

It will be noted in the prior art that each of these edges 20, and in fact the whole of each blade 16, extending up from the outlet end 40 towards the crown 12, is sloped forwardly in the direction in which the runner 10 is rotated by water flow through the passages 18. This direction is indicated by the arrow 26.

In the present invention the Francis-type turbine runner 100 is also formed with the conventional crown 120 and forming one axial end 125 of the runner, a band or ring 140 concentric therewith on the axis of rotation of the runner and an array of blades 160. However, in this case the blades 160 have been significantly modified thereby significantly modifying the flow paths 180 formed between blades 160 leading from the substantially radial inlet adjacent the outer periphery of the blades and the outlet end 190 and through which the water flows as the runner 100 rotates on its axis in the direction indicated by arrow 200.

Figure 2:
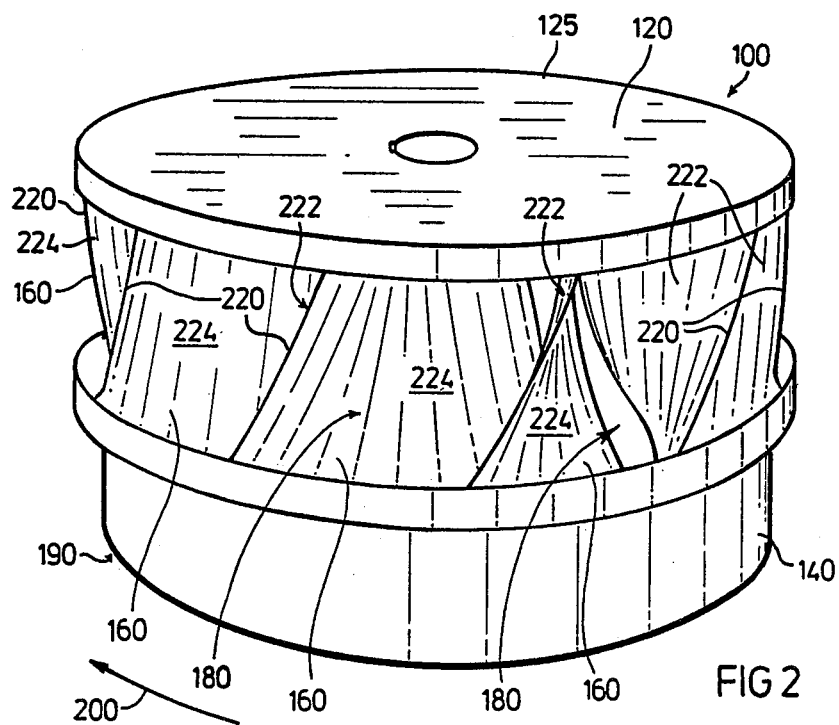
FIG. 2 is a Francis turbine constructed in accordance with the present invention showing a revised orientation and curvature of the blades.

The flow dividing edges 220 formed at the outer periphery of the blades 160 between band or ring 140 and crown 120, as above described and as will be described in more detail herein below, define the line of junction between the suction and pressure faces 222 and 224 respectively of the blades. In the FIG. 2 embodiment, at least a portion the flow dividing edges 220 and of portion of the body of each blade extending toward the crown 120 are sloped rearwardly in the direction of rotation.

The slope of the blade will now be more fully described with reference to FIGS. 3 and 4. An isolated blade 160 has been shown illustrated viewed in FIG. 3 on lines parallel to the axis of rotation in the direction from the crown toward the outlet end 190. The flow dividing edge 220 defining the line of demarkation between the suction surface 222 leading in the direction of rotation and pressure surface 224 trailing the suction face (by trailing the suction face it is meant that a point on the pressure surface located at a given radius on a plane perpendicular to the axis of rotation trails a similar point on the suction surface located at the same radius and on the same plane) and the end 226 of the blade that connects to the crown are clearly shown and the hidden face 228 that connects to the band or ring 140 has been indicated.

It will be noted that a portion A of the blade located on the suction surface 222 immediately adjacent to edge 220 and the junction 230 of the edge 220 with the ring 140 (not shown), is swept back or slopes rearwardly to the direction of rotation and forms an exposed area visible when viewed in the axial direction away from the crown toward the outlet end 190 (end 190 is axially remote from the crown). In the illustrated arrangement the area A overlies a further portion of the area of the suction surface 222 axially spaced from area A. This overlying relationship has been depicted by the points B & C in FIG. 4 on the axial line 231, where the point B lies within the area A, and the point C lies on a further portion of the area of the suction surface 222, exposed when viewed axially from the outlet end indicated at 190. The blade thus has substantially a C shaped outer configuration when viewed in cross section at least adjacent the band 140 and with the suction surface 222 in the immediate vicinity of the junction 230 leading the remainder of the blade in the direction of rotation.

The area A lies between the ring 140 and crown 120 adjacent the edge 220 and junction 230 (i.e. at least in that portion of the surface 222 bounded by junction 230 and a plane perpendicular to the axis of rotation of the runner and passing through the mid point of the edged 230 of each blade 160.

By view axially or in the axial direction it is meant parallel with the axis of rotation for the runner 100 (see FIG. 3) which axis is also obviously aligned with the axis of the crown 120 and band 140.

To more clearly indicate the difference in configuration between the present invention and that of the prior art, FIG. 3 has shown in heavy dash lines the manner in which a blade formed in accordance with the prior art would appear when viewed in the same axial direction. It will be apparent that when the blade of the prior art is considered in isolation as shown in FIG. 3 none of the suction side of the blade is exposed when viewed in an axial direction from the crown, or alternatively substantially all of the suction surface is exposed when viewed axially from the outlet end. As shown in the dash lines the flow dividing edge 20 extends forward in direction of flow from the junction 230 to the mounting end 226' that connects the blade to the crown so the radial extremity of the blade adjacent the crown leads the remainder of the blade in the direction of rotation.

As above indicated fillets are normally provided connecting the blade to the band and crown such fillets for the purpose of defining the invention have not been considered as part of the blade i.e. the trim blade, particularly suction side of the blade is not to be read as the fillet.

EXAMPLE

Tests on a relatively unrefined turbine model embodying the present invention permitted reduction of shaft speed by an extra 3% before leading edge cavitation was encountered compared to a model turbine of conventional design highly refined to reduce such cavitation. Leading edge cavitation typically increases progressively with reduction in shaft speed for a given head. Synchronous shaft speed i.e., the speed at which the generator produces grid frequency current is usually at or near the best efficiency operating point of the turbine and it is therefore desirable but not always possible that leading edge cavitation start at a shaft speed which is less than synchronous speed. Thus a 3% reduction in shaft speed before cavitation is encountered provides a significant advantage over the prior art. In practice such a 3% change in model speed according to the laws of simulatude indicates that if with a conventional runner operating under a given head condition would result in cavitation, use of the present invention under the same condition would eliminate or significantly reduce such cavitation.

Having described the invention, modifications will be evident to those skilled in the art without departing from the spirit of the invention as defined in the appended claims.

What we claim as new and desire to secure by Letters Patent of the United States of America is:

1. A Francis-type hydraulic turbine runner rotatable about an axis of rotation and having a crown forming the upper axial end thereof when said axis of rotation is substantially vertical, a band concentric with said crown on said axis of rotation and an array of blades between said band and said crown, said runner terminating at its lower end in an outlet end, each of said blades having a suction face and a pressure face trailing said suction face in the direction of rotation, said suction and pressure faces meeting between said band and said crown at the outer periphery of each of said blades in a flow dividing edge, said faces providing substantially smooth streamlined surfaces to define flow paths between adjacent of said blades in said array, each of said flow dividing edges meeting with and terminating at said band adjacent an upper edge of said band at a junction, a first portion of said suction surface of each blade located immediately adjacent to said junction and said flow dividing edge being exposed when viewed in an axial direction looking toward said outlet end so that said first portion of said suction face extending from said band toward said crown is sloped rearwardly in the direction of rotation of said runner, a second portion of each of said suction surfaces located spaced from said first portion, said second portions being exposed when viewed in an axial direction looking from said outlet and being located below said junctions.

2. A Francis-type hydraulic turbine as defined in claim 1 wherein at least an area of said first portion on each of said blade is in spaced apart alignment in the axial direction with an area of said second portion on its respective blade.

3. A Francis-type turbine runner as defined in claim 1 wherein said flow dividing edge extending from said junction at least part way toward said crown slopes rearwardly to the direction of rotation.

* * * * *